United States Patent Office 3,359,144
Patented Dec. 19, 1967

3,359,144
GELLED HYDRAZINE
Bobby Leroy Atkins, Lake Jackson, and Billy Gene Harper, Brazoria, Tex., assignors to The Dow Chemical Company, Midland, Mich., a corporation of Delaware
No Drawing. Filed July 23, 1964, Ser. No. 384,802
4 Claims. (Cl. 149—36)

This invention concerns gelled hydrazine and a method for making gelled hydrazine.

Hydrazine, a highly desirable propellant, would be more desirable if an effective gelation agent therefor were known.

The difficulty with attaining effective gelation of hydrazine resides in the unique nature of hydrazine, a basic highly polar liquid having strong reducing properties. Attempts to gel hydrazine have been largely unsuccessful with many gellants because of its reactivity. The only operable thickeners are thixotropic inert substances having a large amount of surface per unit of mass. These give thickened hydrazine but not a true gel thereof. For example, colloidal silica gives a thickened hydrazine, not a true gel, wherein a high volume percentage, about 100 percent of silica, hydrazine basis, must be used. The silica is, of course, inert and does not burn, and thus reduces greatly the effectiveness per unit of volume of the thickened hydrazine.

It has now been discovered that hydrazine can be made into a particulate gel by mixing therewith certain resinous polymeric gelation agents, which, if sheared, break down into smaller particles which retain the gel characteristics. It is an additional advantage of these particles of gelling agents that only a small amount, from about 0.1 to about 10 weight percent, hydrazine basis, need be used. Also, the gelling agents of this invention burn up.

The novel gelled hydrazine compositions of this invention are made by dispersing in hydrazine from about 0.1 to about 10 weight percent of particles of a cross-linked resinous polymeric acrylic and/or methacrylic acid alkali metal and/or ammonium salt and/or cross-linked copolymers of acrylic and/or methacrylic acid salts, as aforesaid, with acrylamide and/or methacrylamide. The dispersion of gellant polymer particles is prepared by mixing the powdered or ground particles of polymer with hydrazine in proportion of about 0.1 to about 10 weight percent of the polymer, and preferably 0.1 to 2 weight percent thereof, based on hydrazine. Any convenient mechanical mixer suitable for mixing high viscosity or gelled materials may be used, e.g., dough mixers.

The polymers useful in the process of this invention are the water-insoluble but water-dispersible, water-swellable, crosslinked resinous polymeric alkali metal and/or ammonium salts of polyacrylic and/or polymethacrylic acid and water-insoluble, water dispersible, water swellable crosslinked copolymers of from 1 to 85 mole percent acrylamide and/or methacrylamide with, corresponding, 99 to 15 mole percent alkali metal and/or ammonium acrylate and/or methacrylate and mixtures of such resins. Of the last named copolymers, those having from 55 to 70 mole percent acrylamide and/or methacrylamide and, correspondingly from 45 to 30 mole percent alkali metal and/or ammonium acrylate and/or methacrylate are preferred. Mixtures of one or more of the first named polymers with one or more of the last named polymers can also be used. The crosslinked polymers may be radiation crosslinked or chemically crosslinked with crosslinking agents having a plurality of $CH_2{=}C{<}$ groups, which crosslinkings agents advantageously are water soluble since a higher percentage thereof can be incorporated in the polymers without reducing the water-swellability to too low a level. By water-swellability in a polymer of the type described above is meant a polymer having the ability to imbibe water and swell like a sponge to form a gel.

The gel capacity of these polymers is determined by dispersing a given weight of dry polymer particles in an amount of water in excess of that required to completely swell the polymer particles. The free water is then drained from the gel particles and the weight of the gelled particles is then determined. The quotient of the completely gelled polymer particles weight divided by the initial weight of the dry polymer particles gives the gel capacity. The polymers useful in the products of this invention have a gel capacity of at least 20 and preferably at least 100 and more. The amount and kind of crosslinking agent have a considerable effect upon the gel capacity. The effect can be varied as desired in amount sufficient to give polymers having effective gel capacities, and is readily determinable by a simple trial or series of trials.

The polymers useful in making the gelled hydrazine compositions of this invention are made by conventional solution, suspension, emulsion or precipitation type polymerization procedures wherein redox, radiation, peroxide and azo-type catalyst systems are used. Representative procedures are found in U.S. Patents 2,810,716 and 3,090,736. In such systems, using conventional polymerization procedures, the crosslinked salts of polyacrylic and/or polymethacrylic acid are prepared from acrylic acid and/or methacrylic acid and a crosslinking agent, advantageously a water-soluble crosslinking agent, and thereafter the resulting polymeric acids are neutralized with an alkali metal and/or ammonium hydroxide. Alternatively, the corresponding salts of acrylic and/or methacrylic acid are polymerized together with a crosslinking agent. Similarly, acrylic acid and/or methacrylic acid and their salts are copolymerized with acrylamide and/or methacrylamide, together with a crosslinking agent.

The water-soluble crosslinking agents especially advantageous in preparing the resin delineated above are divinylbenzene sulfonate, ethyleneglycol diacrylate, ethyleneglycol dimethacrylate, propyleneglycol diacrylate, allyl acrylate, N,N'-methylenebisacrylamide, divinyl ether, diallyl ether, ethyleneglycoll diallyl ether, diethyleneglycol divinyl ether, triethylene glycol divinyl ether and the like difunctional organic monomers having two unsaturated groups, as indicated above, which preferably have some water solubility such that the small amounts required will dissolve in the reaction medium. However, even relatively water-insoluble difunctional crosslinking agents which are capable of being dispersed so as to react in aqueous media to form a crosslinked polymer are useful. Illustrative of the latter is the difunctional monomer divinylbenzene and the like aromatic compounds having two $CH_2{=}C{<}$ substituent groups.

The following examples describe completely representative specific embodiments and the best mode contemplated by the inventors of carrying out the invention. They are not to be taken as limiting the invention other than as defined in the claims.

*Example 1*

Three 100 g. samples of 95 percent hydrazine (Eastman Chemicals anhydrous) where mixed with varying amounts of a finely ground copolymer of 70 percent acrylamide and 30 percent sodium acrylate crosslinked with 1000 p.p.m. N,N'-methylenebisacrylamide (NN'MBA)

and having a gel capacity of about 1100 in water. These samples contained 0.1, 0.5, and 1.0 percent by weight of the copolymer, respectively. Each of these samples was gelled within a minute of the time the copolymer was added.

*Example 2*

In the manner of Example 1, a coolymer of acrylamide and potassium acrylate, similarly crosslinked with

NN'MBA having a gel capacity of 950 in water, was added in varying amounts to hydrazine. A gel was formed in each case, but took 5-10 minutes to form. Results, except for rate of gelation, were similar to those of Example 1.

*Example 3*

A polymer of ammonium acrylate was prepared by exposing an aqueous solution of about 50 percent ammonium acrylate to a beam of ionizing radiation, pursuant to a procedure of U.S. Patent 3,090,736. It had a gel capacity of 550 in water. Two percent of this polymer gave a hydrazine gel equivalent in consistancy to that obtained with 0.5 percent polymer as in Example 1.

*Example 4*

In like manner the sodium and potassium salts of crosslinked polymers of acrylic acid having a gel capacity of at least 20 also gelled hydrazine when mixed therewith in proportions of from about 0.1 to 10 weight percent, hydrazine basis.

Any of the other polymers described hereinabove which have a gel capacity of at least 20 and preferably at least 100 or more are substituted for the polymers of Examples 1-4 with similar advantageous results.

The products of this invention are pumpable particulate hydrazine gels suitable per se as rocket fuels. They are capable of having organic and inorganic solid fuel particles suspended therein.

What is claimed is:

1. Hydrazine gelled with about 0.1-10 weight percent, hydrazine basis, of particles of a crosslinked resinous gellant polymer selected from the group consisting of (1) polymers of at least one salt of the group consisting of acrylic and methacrylic acid alkali metal and ammonium salts and (2) copolymers of 15 to 99 mole percent of at least one salt of the group consisting of acrylic and methacrylic acid alkali metal and ammonium salts with a balance of at least one member of the group consisting of acrylamide and methacrylamide, and wherein said resinous polymer is crosslinked with a small proportion of a crosslinking agent in amount to give a polymer having a gel capacity of at least 20.

2. A hydrazine gel as in claim 1 wherein the gellant is a copolymer of 70 weight percent acrylamide and 30 weight percent sodium acrylate, crosslinked with 1000 p.p.m., said monomers basis, of N,N'-methylenebisacrylamide.

3. Method for making a hydrazine gel by dispersing in hydrazine about 0.1-10 weight percent, hydrazine basis, of particles of a crosslinked resinous gellant polymer selected from the group consisting of (1) polymers of at least one salt of the group consisting of acrylic and methacrylic acid alkali metal and ammonium salts and (2) copolymers of 15 to 99 mole percent of at least one salt of the group consisting of acrylic and methacrylic acid alkali metal and ammonium salts with a balance of at least one member of the group consisting of acrylamide and methacrylamide, and wherein said resinous polymer is crosslinked with a small proportion of a crosslinking agent in amount to give a polymer having a gel capacity of at least 20.

4. The method of claim 3 wherein the gellant is a copolymer of 70 weight percent acrylamide and 30 weight percent sodium acrylate, crosslinked with 1000 p.p.m., monomers basis, of N,N'-methylenebisacrylamide.

References Cited

UNITED STATES PATENTS

| | | | |
|---|---|---|---|
| 3,232,801 | 1/1966 | Bost et al. | 149—19 |
| 3,164,505 | 1/1965 | Hsiel et al. | 149—36 |
| 3,097,120 | 7/1963 | Hoffman et al. | 149—19 |

BENJAMIN R. PADGETT, *Primary Examiner.*